US010436123B2

(12) United States Patent
Meyer et al.

(10) Patent No.: US 10,436,123 B2
(45) Date of Patent: Oct. 8, 2019

(54) METHODS AND APPARATUS FOR CLOSED-LOOP CONTROL OF A GAS TURBINE

(71) Applicant: General Electric Company, Schenectady, NY (US)

(72) Inventors: Benjamin Meyer, Nussbaumen (CH); Marco Alexander Weingaertner, Bad Saeckingen (DE); Martin Erwin Gassner, Bern (CH); Stefano Bernero, Oberrohrdorf (CH)

(73) Assignee: General Electric Company, Schenectady, NY (US)

( * ) Notice: Subject to any disclaimer, the term of this patent is extended or adjusted under 35 U.S.C. 154(b) by 232 days.

(21) Appl. No.: 15/453,421

(22) Filed: Mar. 8, 2017

(65) Prior Publication Data

US 2018/0258865 A1    Sep. 13, 2018

(51) Int. Cl.
*F02C 9/28* (2006.01)
*F23N 5/16* (2006.01)
*F01D 19/00* (2006.01)

(52) U.S. Cl.
CPC .............. *F02C 9/28* (2013.01); *F01D 19/00* (2013.01); *F23N 5/16* (2013.01); *F05D 2220/32* (2013.01);
(Continued)

(58) Field of Classification Search
CPC .... F02C 9/26; F02C 9/28; F23R 2900/00013; F23R 2900/00014; F05D 2260/96; F05D 2260/964; F23N 5/16
See application file for complete search history.

(56) References Cited

U.S. PATENT DOCUMENTS 7,188,019 B2 * 3/2007 Nomura .................... F02C 9/28
                                                      60/39.281
7,278,266 B2 * 10/2007 Taware .................. F23N 5/003
                                                       60/39.27
(Continued)

FOREIGN PATENT DOCUMENTS

EP        1286031 A1      2/2003

OTHER PUBLICATIONS

Extended European Search Report and Opinion issued in connection with corresponding EP Application No. 18160625.2 dated Jul. 5, 2018, 11 pages.

*Primary Examiner* — Steven M Sutherland
*Assistant Examiner* — James P McGlynn
(74) *Attorney, Agent, or Firm* — Hanley, Flight and Zimmerman, LLC

(57) ABSTRACT

Methods, apparatus, systems and articles of manufacture are disclosed for closed loop control of a gas turbine. An example apparatus includes a frequency band splitter to separate a combustion pulsation signal into a plurality of frequency bands. The example apparatus includes a plurality of subcontrollers, each subcontroller corresponding to one of the frequency bands. Each subcontroller is to be activated at an amplitude threshold associated with the normal operating set point of the frequency band and to generate a correction value while the corresponding frequency band is operating beyond the amplitude threshold. The example apparatus includes a net correction output calculator to aggregate the correction values to generate an aggregated correction value. The example apparatus includes a subcontroller limiter having a maximum limit and/or a minimum limit to inhibit subcontroller(s) from increasing their respective correction values when aggregated correction value is to exceed the maximum limit and/or minimum limit.

20 Claims, 11 Drawing Sheets

(52) U.S. Cl.
CPC .. *F05D 2260/964* (2013.01); *F05D 2270/082* (2013.01); *F05D 2270/11* (2013.01); *F05D 2270/20* (2013.01); *F05D 2270/301* (2013.01); *F05D 2270/333* (2013.01); *F05D 2270/706* (2013.01); *F23N 2041/20* (2013.01); *F23R 2900/00013* (2013.01)

(56) References Cited

U.S. PATENT DOCUMENTS

| | | | | |
|---|---|---|---|---|
| 7,337,057 | B2* | 2/2008 | Norman | F02C 9/00 60/39.27 |
| 7,451,601 | B2* | 11/2008 | Taware | F23N 5/16 60/39.281 |
| 7,513,117 | B2* | 4/2009 | Garay | F23R 3/34 431/1 |
| 8,396,643 | B2* | 3/2013 | Nomura | F02C 3/22 701/103 |
| 8,527,247 | B1* | 9/2013 | Wilson | G05B 13/04 416/36 |
| 2004/0011020 | A1* | 1/2004 | Nomura | F01D 17/162 60/39.281 |
| 2005/0107942 | A1 | 5/2005 | Nomura et al. | |
| 2006/0040225 | A1 | 2/2006 | Garay et al. | |
| 2006/0266045 | A1 | 11/2006 | Bollhalder et al. | |
| 2008/0177456 | A1* | 7/2008 | Hill | F02C 9/26 701/100 |
| 2009/0229238 | A1 | 9/2009 | Zhang et al. | |
| 2015/0052904 | A1 | 2/2015 | Lipari et al. | |
| 2016/0333798 | A1* | 11/2016 | Larson | F02C 9/28 |
| 2016/0356495 | A1 | 12/2016 | Bernero et al. | |
| 2017/0044996 | A1* | 2/2017 | Deuker | F02C 9/00 |

* cited by examiner

METHODS AND APPARATUS FOR CLOSED-LOOP CONTROL OF A GAS TURBINE

FIELD OF THE DISCLOSURE

This disclosure relates generally to gas turbine engines, and, more particularly, to closed loop control of a gas turbine.

BACKGROUND

In recent years, gas turbines have been found to be an exceptionally useful engine in a variety of fields. Gas turbines are complex machines with extensive operation and maintenance requirements. Traditionally, gas turbine operation is defined by fixed schedules of operating parameters specified, for example, to reduce pollutants or produce a certain amount of power.

The pursuit of increased gas turbine efficiency requires gas turbines to be operated at a lean fuel-to-air ratio. Gas turbines operating on a lean fuel-to-air ratio generally produce undesired combustion pressure oscillations that may damage or reduce the lifespan of various gas turbine components.

Figure 1:
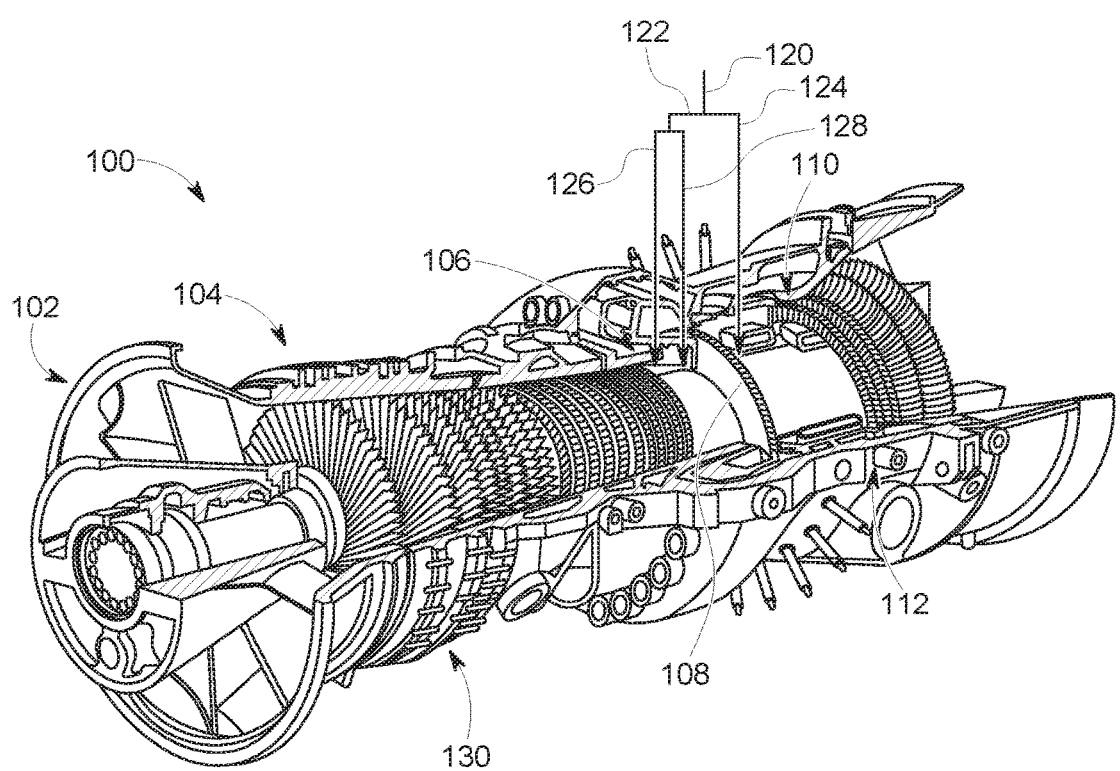
FIG. 1 illustrates an example gas turbine system in which the examples disclosed herein can be implemented.

The figures are not to scale. Instead, to clarify multiple layers and regions, the thickness of the layers may be enlarged in the drawings. Wherever possible, the same reference numbers will be used throughout the drawing(s) and accompanying written description to refer to the same or like parts. As used in this patent, stating that any part (e.g., a layer, film, area, or plate) is in any way positioned on (e.g., positioned on, located on, disposed on, or formed on, etc.) another part, means that the referenced part is either in contact with the other part, or that the referenced part is above the other part with one or more intermediate part(s) located therebetween. Stating that any part is in contact with another part means that there is no intermediate part between the two parts.

BRIEF SUMMARY

Methods, apparatus, systems and articles of manufacture are disclosed for closed loop control of a gas turbine.

Certain examples provide an apparatus for closed loop control of a gas turbine having an operating set point. The example apparatus includes a frequency band splitter to separate a combustion pulsation signal into a plurality of frequency bands, each frequency band having a combustion characteristic and a normal operating set point. The example apparatus includes a plurality of subcontrollers, each subcontroller corresponding to one of the plurality of frequency bands and the associated combustion characteristic and normal operating set point of the respective frequency band, wherein each subcontroller is to be activated at an amplitude threshold associated with the normal operating set point of the frequency band and to generate a correction value while the corresponding frequency band is operating beyond the amplitude threshold. The example apparatus includes a net correction output calculator to aggregate the correction values from the plurality of controllers to generate an aggregated correction value. The example apparatus includes a subcontroller limiter having at least one of a maximum limit or a minimum limit to inhibit one or more subcontrollers from increasing their respective correction values when aggregated correction value is to satisfy the at least one of a maximum limit or a minimum limit.

Certain examples provide a method for controlling a gas turbine having a plurality of combustion frequencies. The example method includes splitting a combustion pulsation signal into a plurality of frequency bands, each frequency band having a normal operating set point. The example method includes evaluating each of the plurality of frequency bands using a corresponding subcontroller in a plurality of subcontrollers to: determine whether the frequency band meets a pressure amplitude threshold; and determine a correction value activated by the corresponding subcontroller in response to the frequency band meeting the pressure amplitude threshold. The example method includes aggregating the correction values from each of the plurality of subcontrollers to generate an aggregated correction value. The example method includes inhibiting each of the plurality of subcontrollers from providing a correction value beyond a limit.

Certain examples provide a method for inhibiting a gas turbine subcontroller. The example method includes receiving, from a plurality of subcontrollers, a plurality of correction values, each correction value corresponding to an individual subcontroller and having a magnitude. The example method includes aggregating the plurality of correction values to form an aggregate correction value, wherein a first subset of correction values is an addition to the aggregate correction value and a second subset of correction values is a subtraction to the aggregate correction value, and wherein the aggregate correction value is determined based on a sum of the plurality of correction values. The example method includes determining whether the aggregate correction value exceeds a maximum limit or minimum limit. The example method includes, when the aggregated correction value is determined to satisfy the maximum limit or the minimum limit, inhibiting a selected subcontroller from the plurality of subcontrollers, the selected subcontroller associated with a correction value contributing toward the aggregate correction value satisfying the maximum limit or the minimum limit.

Certain examples provide a computer readable storage medium comprising instructions that, when executed, cause a controller to at least split a combustion pulsation signal into a plurality of frequency bands, each frequency band having a normal operating set point. The example instructions, when executed, cause the controller to at least evaluate each of the plurality of frequency bands using a corresponding subcontroller in a plurality of subcontrollers to: determine whether the frequency band meets a pressure amplitude threshold; and determine a correction value activated by the corresponding subcontroller in response to the frequency band meeting the pressure amplitude threshold. The example instructions, when executed, cause the controller to at least aggregate the correction values from each of the plurality of subcontrollers to generate an aggregated correction value. The example instructions, when executed, cause the controller to at least inhibit each of the plurality of subcontrollers from providing a correction value greater than a limit.

Detailed Description

Gas turbines are tasked to operate with increasing efficiency while producing lower levels of pollutants in their exhaust gases. Gas turbine efficiency can be improved, for example, by increasing flame temperature(s). However increasing flame temperature also increases pollutant level(s). For example, nitrogen oxide (NOx) is produced as a pollutant at a level that is an exponential function of the flame temperature. One known method to control the NOx levels in a turbine's exhaust gas is to operate burner(s) in the turbine with a maintained lean flame (e.g., at a lean fuel-to-air ratio, which lowers the flame temperature, etc.). However, a lean flame can lead to low frequency pulsations of the flame, and/or combustion pressure oscillations, which can reduce the lifetime of a hot gas path components. The formation of NOx and pulsations are influenced by several interconnected physical mechanisms such as ambient atmospheric conditions, fuel composition, firing and flame temperature, combustion homogeneity, burner velocity, etc.

Low NOx-emissions and low pulsation levels, both of which are desirable in a gas turbine plant, are two counteracting physical processes. When a flame becomes leaner, the NOx-emissions decrease. However, low frequency pulsations increase with the leaner flame. Additionally, the more uniform the flame temperature, the greater the NOx emissions, while the pulsations decrease.

Operating a gas turbine at rich fuel conditions and higher efficiency is not sufficient to control gas turbine pulsations. Gas turbines operating at high temperatures encounter high frequency pulsations. Both rich and lean gas turbine operating parameters can promote damaging pulsations, and gas turbine controllers focus on either the rich or the lean pulsation frequencies.

The presently disclosed control systems and associated methods achieve an improved and advantageous operation of a gas turbine combustion system at least because the control system has a greater ability than prior control systems to control the spontaneous and simultaneous pulsation peaks in both high and low frequencies. As a result of the controlled pulsation peaks of the combustion, both the lifetime of the combustion system and the engine availability are increased beyond that which has been obtainable using prior techniques.

Certain examples provide an improved control system (also referred to herein as a controller) applicable to combustion systems with multiple burners and two or more combustion chambers arranged in sequence, one burner downstream from another burner. In some examples, other combustion systems that can be controlled by the disclosed controller include multiple burners leading into a single combustion chamber, etc.

An example gas turbine system to which the present example control system is applicable includes main and supplementary burners. For example, there can be a greater number of main burners compared to supplementary burners or, for example, the main burners are operated with a richer fuel than the supplementary burners. In other examples, the control system is applied to a gas turbine system having primary, secondary, and tertiary burners.

In some examples, burners can be divided into can and/or annular combustor groupings. For example, multiple can combustors can operate in parallel such that the can combustors are divided into multiple groups of can combustors. In such an example, fuel ratios are controlled so a main can combustor group is operated richer than a secondary (and/or tertiary, etc.) combustor group. Additionally or alternatively, each can combustor can have multiple fuel stage groups. In such an example, within each can combustor, fuel ratios are controlled such that one primary group of burners operates richer than a secondary (and/or tertiary, etc.) group.

The controller includes a combustion pulsation signal processor to receive pulsation measurement data, including one or more pulsation levels measured in the gas turbine combustion system. The combustion pulsation signal processor can also apply a band-pass filter to the pulsation measurement data, separating the data into separate frequency bands. Additionally, the controller has a correction calculator for determining a correction value for each frequency band operating beyond a threshold. For example, the gas turbine has a normal operating set point, a set of conditions desired for regular operation, but pressure amplitudes may peak and operate far beyond the normal operating set point, such that the amplitudes exceed a threshold value away from the normal operating set point. The normal operating set point of the gas turbine can, in some examples, include pressure amplitudes, flame temperatures, power generation, etc.

In certain examples, the band-pass filter can split a raw combustor pulsation signal into separate frequency bands (e.g., a pulsation bands). Each frequency band, having different pulsation characteristics and affecting the operation of the gas turbine differently, can be controlled by a different subcontroller within the correction calculator, having its own set point and gain values. Control of the frequency bands is facilitated by altering the fuel mass flow, for example.

In certain examples, fuel distribution among the burners is distributed among main burner groups and supplementary burner groups, or among main and supplementary stages, for example. An example fuel flow ratio is defined by:

$$\gamma = \frac{m_{supp}}{m_{total}} = \frac{(m_{total} - m_{main})}{m_{total}}, \quad \text{(Eq. 1)}$$

where $m_{total}$ is a total fuel mass flow, $m_{main}$ is a fuel flow to the main burner(s), and $m_{supp}$ is a fuel flow to the supplementary burner(s).

Additionally, in various examples, a main fuel mass flow is divided into a stage one fuel mass flow, which feeds a stabilizing injector (e.g., pilot flame) of the first combustion chamber, and a stage two fuel mass flow, which is the primary combustion fuel for the first combustion chamber. A ratio of stage one fuel mass flow to main fuel mass flow is defined as a stage one ratio (S1R). In certain examples, a higher S1R corresponds to a higher fuel mass flow that is combusted in a pilot flame of a main burner group. A higher S1R allows a more stable flame while a lower S1R leads to a less stable flame.

In certain examples, the S1R is at a higher ratio, up to approximately 90%, during startup and minimum turbine loading. After startup, when combustion has stabilized, S1R is transitioned to a lower ratio such as 25%. The S1R is lowered as a gas turbine load and/or a hot gas temperature (e.g., flame combustion temperature, the high pressure (HP) turbine outlet temperature (TAT1), exhaust temperature, etc.) increases, for example.

As discussed above, pulsations can vary greatly based on flame combustion temperature. Frequency bands associated with the pulsations can have conflicting behaviors, such as low frequency bands involving a leaner combustion and high frequency bands involving a richer combustion. Control of a turbine can be complicated by the variation in pulsation and associated frequency band.

In accordance with the present disclosure, control of simultaneous pulsation peaks in a gas turbine can be facilitated by controlling combustion through fuel supply and burner activity in the turbine. During abnormal operating periods, an example controller adjusts the fuel flow (e.g., adjusting the S1R towards a rich (e.g., higher ratio) or lean (e.g., lower ratio) level, etc.). For example, a rich S1R helps ensure a stable, hot pilot flame which influences the gas turbine combustion towards a hotter combustion, while a lean S1R influences the combustion to a cooler combustion. Each frequency band subcontroller is activated at a specified pulsation amplitude (e.g., 10-200 mbar, etc.), and generates a correction value when the frequency band is operating beyond a threshold.

Additionally, a net correction calculator can aggregate the correction values from all the subcontrollers to generate an aggregate correction value. Correction values can be added or subtracted from the aggregate correction value. For example, a subcontroller correction value is added for a richer combustion and a value is subtracted for a leaner combustion.

A control action in response to an aggregate correction value can, for example, be applied to a variety of gas turbine systems. For example, control of fuel ratios in multi-staged burner systems (e.g., multiple combustion chambers, burners operating sequentially, etc.) or burner systems with various burner groupings (e.g., can combustor groups, fuel stage groups, including swirl generator and/or mixing zone, etc.) can be used to correct for pulsation amplitudes operating outside an accepted range. An example turbine implementation and S1R analysis are provided herein for purposes of illustration only.

In certain examples, the aggregate correction value is limited to avoid engine trip. For example, if S1R is too high, NOx emissions can increase and high frequency pulsations/dynamics can occur. In certain examples, the positive S1R signal is limited to a +10% change in S1R such that, if the sum value of positive subcontrollers is 10%, a limiter prevents contributing subcontroller(s) (e.g., those subcontrollers adding towards the limit) from increasing their respective outputs. Similarly, the sum of negative subcontrollers is limited to a −5% change in S1R, for example, and contributing subcontroller(s) are similarly inhibited. In various examples, these positive and negative limits can be either higher or lower.

After the controller returns the frequency bands to within an accepted range of their operating set points, the subcontrollers no longer generate a control value. The controller only operates in abnormal gas turbine operating conditions.

FIG. 1 illustrates an example gas turbine 100 in which the examples disclosed herein can be implemented. In the illustrated example, the gas turbine 100 accepts air via an intake 102. Air is compressed via a staged compressor 104. In some examples, the air is compressed to a pressure greater than ambient conditions (e.g., 32 times greater than the surrounding air pressure, etc.). In the illustrated example, compressed air is passed from the staged compressor 104 to a first combustor 106 (e.g., also referred to as an environmental (EV) combustor, main combustor, etc.). After fuel is added and combusted in the example first combustor 106, the air passes through a high pressure turbine 108 into a second combustor 110 (e.g., also referred to as a sequential environmental (SEV) combustor, supplementary combustor, re-heat combustor, etc.) where additional fuel is added and combusted in the second combustor 110. In some examples, the gas turbine 100 may have only one combustion chamber or non-sequential combustion chambers. After air exits the second combustor 110, air then passes through a low pressure turbine 112 and exits the example gas turbine 100, for example.

In the illustrated example, a fuel flow 120 is divided such that a first fuel flow 122 is fed to the example first combustor 106 and a second fuel flow 124 is fed to the example second combustor 110. For example, a ratio of the first fuel flow 122 to the second fuel flow 124 can vary depending on load and gas turbine operation. Additionally, the example fuel flow 122 is divided between a stage one fuel flow 126 and a stage two fuel flow 128. In accordance with the present disclosure, a ratio of the stage one fuel flow 126 to the first fuel flow 122 defines a stage one ratio (S1R).

For example, the example stage one fuel flow 126 is fed to a pilot flame in the first combustor 106, and the example stage two fuel flow 128 is combusted in the first combustor 106. Additionally, the example second fuel flow 124 is fed to the second combustor 110 and is combusted via autoignition. In the illustrated example, autoignition is dependent upon a high pressure turbine outlet temperature (TAT1) and the reactivity of the fuel. It should be understood that the reactivity of the fuel is the tendency of the fuel to combust at high temperatures and pressures.

During normal operating conditions, primary control of the pressure pulsations in the example gas turbine 100 is facilitated, for example, via control of the fuel flow and, particularly, adjusting the S1R. Variable inlet guide vanes 130 can also be added, in some examples, at the example inlet 102 for further control of the gas turbine 100.

A high ratio S1R allows a more stable flame but produces high NOx emissions and higher high frequency pressure pulsations. Conversely, a low ratio S1R allows low NOx emissions but leads to a less stable flame and higher low frequency pressure pulsations. Thus, for example, in response to high frequency pressure pulsation peaks in the gas turbine 100 the S1R is reduced, while in response to low frequency pressure pulsation peaks the S1R is increased.

For example, an operation window of the gas turbine 100 is typically limited by pressure pulsations which appear at different frequencies and amplitudes. In some examples, different pulsation frequencies can have different effects on the physical components of the gas turbine 100. As a result, in various examples, one pulsation peak can be more important to correct than a different pulsation peak.

Figure 2:
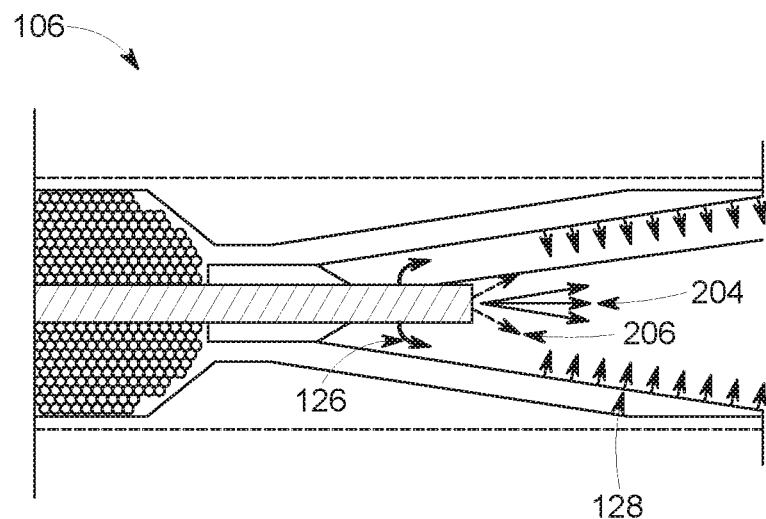
FIG. 2 illustrates an example first combustor that can be implemented in the example gas turbine of FIG. 1.

FIG. 2 illustrates an example first combustor 106 that can be implemented in the example gas turbine 100 of FIG. 1. In certain examples, twenty-four first combustors 106 are located annularly around the example gas turbine 100. In other examples, the combustor architecture can be can or silo combustors.

In the illustrated example, the stage one fuel flow 126 is combusted as a pilot flame or rich premix flame, igniting and/or stabilizing the example stage two fuel flow 128. In some examples, liquid fuel 204 is fed into the first combustor 106 and protected by shielding air 206.

Figure 3:
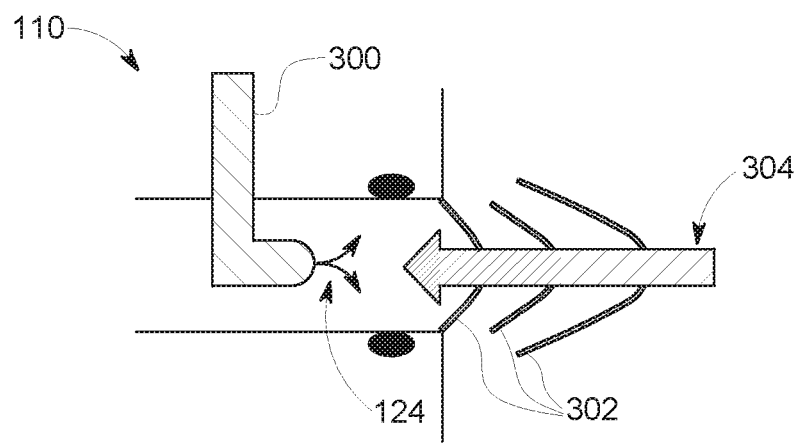
FIG. 3 illustrates an example second combustor that can be implemented in the example gas turbine of FIG. 1.

FIG. 3 illustrates the example second combustor 110 that can be implemented in the example gas turbine 100 of FIG. 1. The example second combustor 110 is located after the high pressure turbine 108 of the example gas turbine 100. In certain examples, the second fuel flow 124 is fed into the example second combustor 110 via a sequential environmental (SEV) combustor lance 300. The example second fuel flow 124 is combusted as a result of the autoignition process, for example. The second fuel flow combusts when the fuel is reactive enough that TAT1 ignites the fuel.

Figure 4:
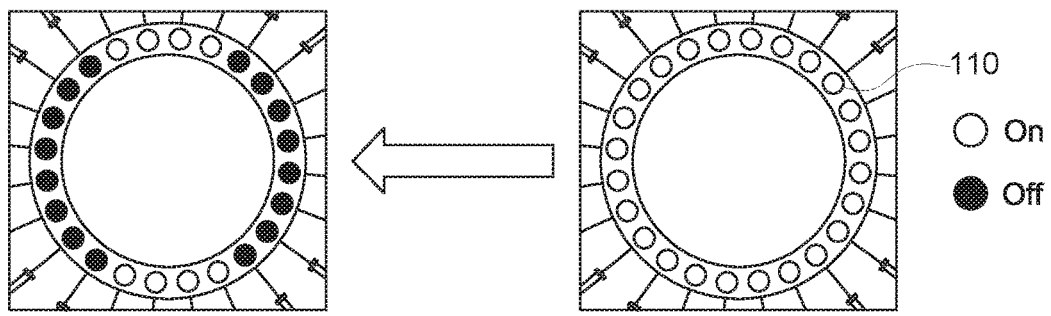
FIG. 4 illustrates an example cross section of a plurality of second combustors that can be implemented in the example gas turbine of FIG. 1.

FIG. 4 illustrates an example cross section of a plurality of second combustors 110 that can be implemented in the example gas turbine 100 of FIG. 1. In the illustrated example, twenty-four second combustors 110 are located annularly about the example gas turbine 100. The example second combustors 110 are capable of partial shutoff, for example, twelve of the twenty-four second combustion combustors 110 can have no second fuel flow 124 fed via the example SEV combustor lance 300. In some examples, as a benefit of autoignition, second combustors 110 can be turned on and off to meet the operational requirements of the example gas turbine 100.

Figure 5:
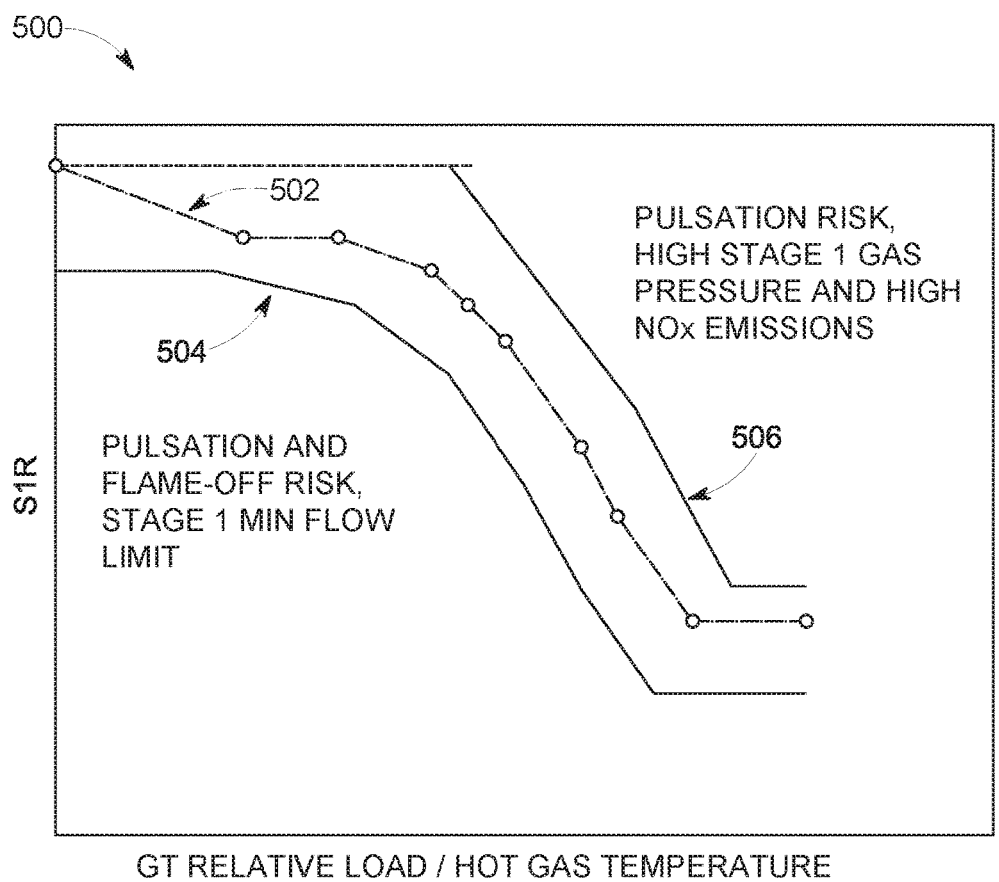
FIG. 5 is a stage one ratio plot of example stage one ratio values in relation to gas turbine load and/or hot gas temperature.
Figure 6:
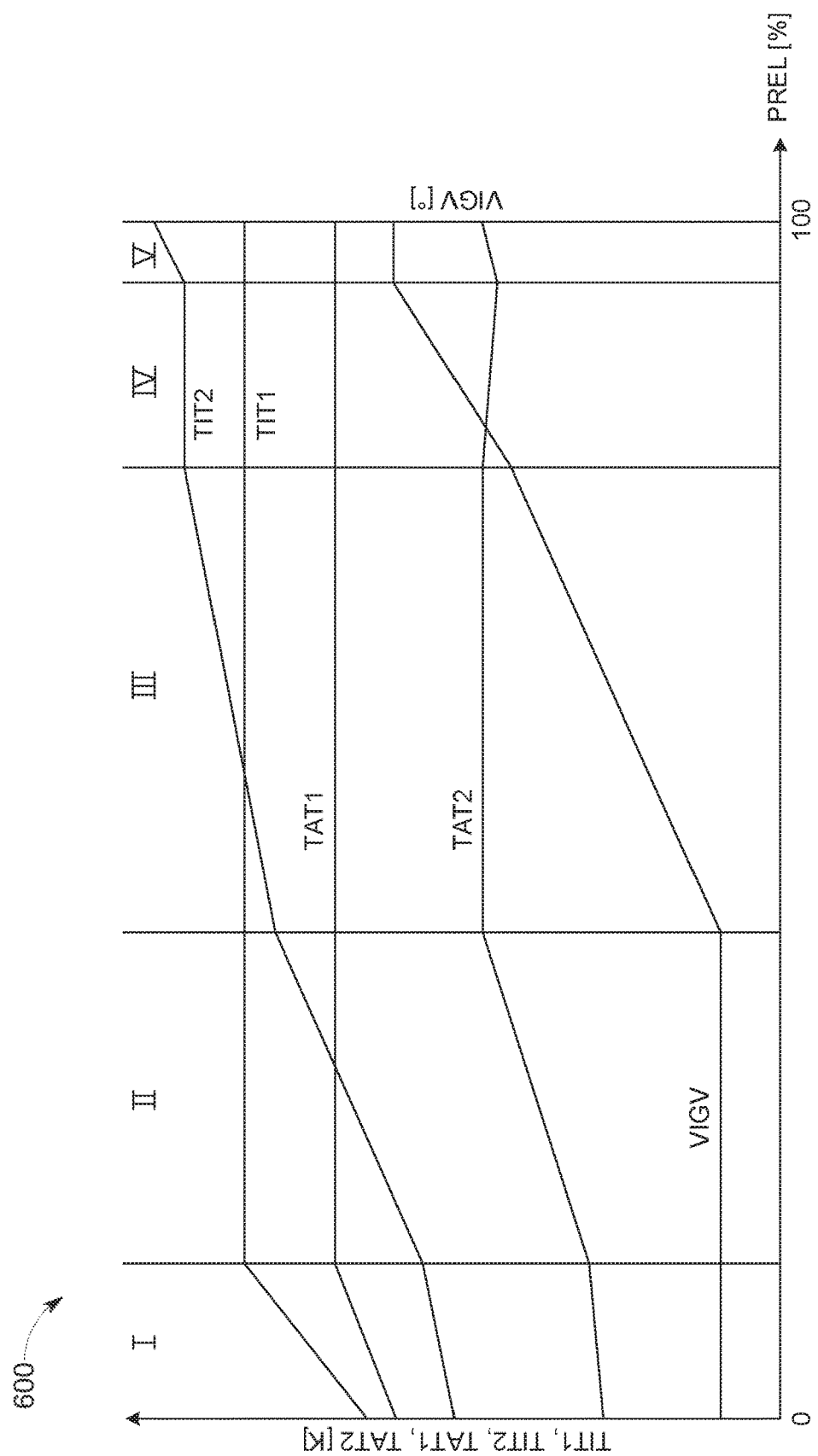
FIG. 6 is a gas turbine load plot of example turbine inlet and outlet temperatures, stage one ratio values, and variable inlet guide vane degrees in relation to the loading of the example gas turbine of FIG. 1.

FIGS. 5-6 provide example value and parameter relationship plots provided for purposes of illustration only. FIG. 5 is a stage one ratio plot 500 of example stage one ratio values in relation to a parameter such as gas turbine load and/or a hot gas temperature (e.g., flame combustion temperature, the high pressure (HP) turbine outlet temperature (TAT1), exhaust temperature, etc.) during the change-over to lean operation (LOP). An $S1R_{LOP}$ line 502 is indicative of an example change-over to lean S1R ratio as a function of the load parameter. The example $S1R_{LOP}$ starts at approximately 90%, and as load parameter increases temperature, $S1R_{LOP}$ lowers to approximately 25%, for example. In some examples, S1R deviates from the load parameter function and peaks over a low frequency pulsation risk line 504 or a high frequency pulsation risk line 506. After the change-over to lean operation is complete, the example $S1R_{LOP}$ 502 remains, in some examples, at approximately 25% during normal operation.

FIG. 6 is an example gas turbine load plot 600 of example turbine inlet and outlet temperatures, stage one ratio values, and variable inlet guide vane degrees in relation to the loading of the example gas turbine 100 of FIG. 1. In the illustrated example, the gas turbine load plot 600 shows the startup of an example gas turbine 100. For example, the gas turbine load plot 600 shows startup parameters (e.g., high pressure turbine outlet temperature (TAT1), low pressure turbine outlet temperature (TAT2), high pressure turbine inlet temperature (TIT1), variable inlet guide vane angle (VIGV), etc.) at a minimum load and normal operating parameters at a base load.

Figure 7:
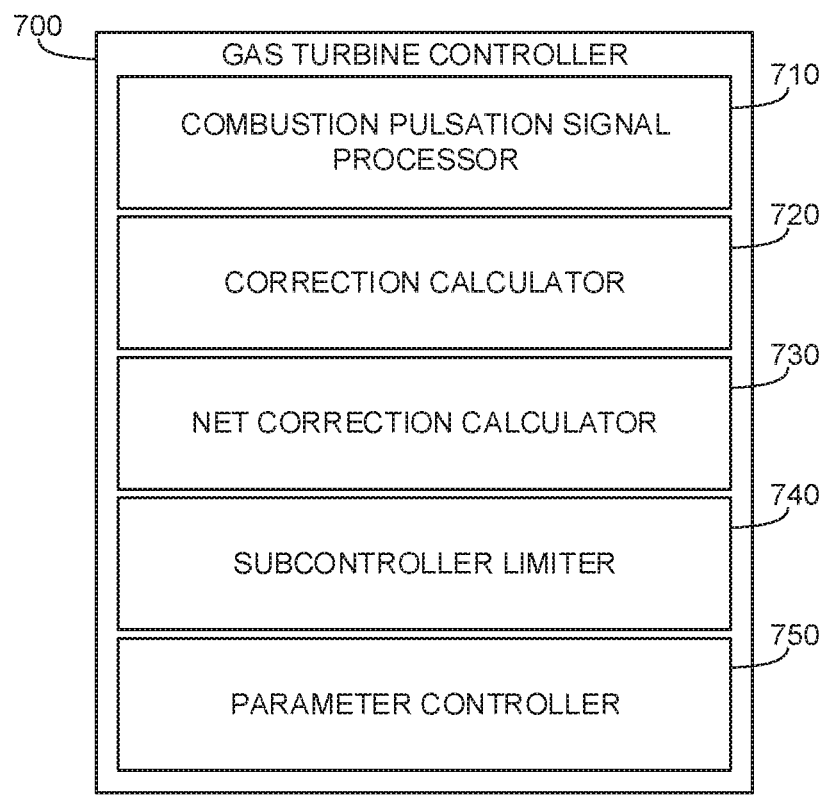
FIG. 7 is a block diagram of an example gas turbine controller implemented in the example gas turbine of FIG. 1.

FIG. 7 is a block diagram of an example gas turbine controller 700 implemented in the example gas turbine 100 of FIG. 1. In some examples, the example gas turbine controller 700 can control one or more of the systems of the gas turbine 100, such as a startup operation and a shutdown operation. In accordance with the present disclosure, the example gas turbine controller 700 is implemented separate from another controller system. However, in other examples, the example gas turbine controller 700 can be implemented in conjunction with another controller system.

In the illustrated example, the gas turbine controller 700 controls pressure frequency band pulsation peaks by adjusting the S1R. In some examples, the example gas turbine controller 700 can control pressure frequency band pulsation peaks by altering a hot gas temperature (e.g., flame temperature, TAT1, exhaust temperature, etc.) or an angle of the variable inlet guide vanes 130 of FIG. 1.

In the illustrated example, the gas turbine controller 700 includes a combustion pulsation signal processor 710. The example combustion pulsation signal processor 710 receives a raw combustion signal from sensors detecting the frequency and amplitude of pressure pulsations in the example gas turbine 100 of FIG. 1. In accordance with the present example of FIG. 7, the example combustion pulsation signal processor 710 splits the raw combustion signal into a series of discrete frequency bands. For example, the combustion pulsation signal processor 710 may divide the raw signal into bands covering small ranges of frequencies, such as, 5-30 HZ, 30-45 HZ, 45-100 HZ, 100-150 HZ, 150-200 HZ, etc. In other examples, there can be more or fewer discrete frequency bands or the frequency bands can cover different ranges.

The example combustion pulsation signal processor 710 sends the discrete frequency band signals to a correction calculator 720. The example correction calculator 720 evaluates each frequency band against a threshold via a subcontroller, and provides a correction value greater than zero if the amplitude of the pressure pulsations is beyond the threshold for the given frequency band. In the illustrated example, each frequency band is evaluated by the respective, particular subcontroller (e.g., a proportional-integral-derivate (PID) controller) having different thresholds and control parameters.

Additionally, the correction calculator 720 can include weights to the example correction value generated by each subcontroller. For example, pressure pulsation frequency band peaks associated with damaging the example gas turbine 100, can be given a weighting factor to increase the correction value for any peaks detected in that frequency band.

In certain examples, the example correction calculator 720 sends each correction value to the net correction calculator 730. In the illustrated example, the net correction calculator 730 receives non-zero values from the correction calculator 720 from only those subcontrollers that evaluated pressure pulsation peaks above the threshold. The example net correction calculator 730 generates an aggregate correction value by adding or subtracting one or more non-zero values. In the illustrated example, the net correction calculator 730 adds the correction values seeking richer combustion and subtracts the correction values seeking leaner combustion. In various examples, the magnitude of the correction values seeking richer combustion may be partially or fully negated by the magnitude of the correction values seeking leaner combustion.

In other examples, the example correction calculator 720 can alternatively give negative values to those frequency bands involving leaner combustion, and the net correction calculator 730 adds positive and negative correction values from the example correction calculator 720. Additionally, the magnitude of the correction value corresponds to the magnitude of the pulsation peak above a threshold, such that a higher pulsation peak incurs a higher correction value, for example.

The example net correction calculator 730 sends the aggregate correction value to the subcontroller limiter 740. The example subcontroller limiter 740 has a maximum limit and a minimum limit (e.g., +10%/−5% change in S1R, etc.). In accordance with the present disclosure, when the net correction calculator 730 reaches a correction value of a +10% change in S1R, the subcontroller limiter can inhibit the subcontrollers of the correction calculator 720 from increasing their individual correction values. Inhibiting subcontrollers from contributing beyond a maximum limit and/or minimum limit prevents engine trip over the maximum limit or lean blow-off below the minimum limit. Lean blow-off is an operating condition or threshold at which the fuel is too lean to maintain a flame within the example gas turbine 100.

After the aggregate correction value returns within the example maximum and minimum limits, the subcontroller limiter 740 ceases to limit any subcontrollers. In some examples, the aggregate correction value returns within the range of the maximum and minimum limits because the corrective action (e.g., a richer or leaner S1R) has begun to return the operating parameters of the example gas turbine 100 back to the example gas turbine 100 operating set point. In other examples, contrary correction values may counteract the correction values contributing to either the example maximum or minimum limit, returning the aggregate correction value to within the example maximum and minimum limits. In such an example, the subcontroller limiter 740 ceases limiting subcontrollers.

In the illustrated example, the subcontroller limiter 740 sends the aggregate correction value determined by the example net correction calculator 730 to a parameter controller 750. The example parameter controller 750 (e.g., an engine object linking and embedding for process control (engine OPC)) enacts a correction to the S1R based on the example aggregate correction value. For example, the example parameter controller 750 increases the stage one fuel flow 126 when a positive aggregate correction value, which correlates to a richer S1R, is received. Alternatively, the example parameter controller 750 decreases the stage one fuel flow 126 when a negative aggregate correction value, which correlates to a leaner S1R, is received. Additionally, if neither a positive or negative aggregate correction value is received by the example parameter controller 750, the stage one fuel flow 126 is fed to the example first combustor 106 according to the normal operating S1R parameter.

Figure 8:
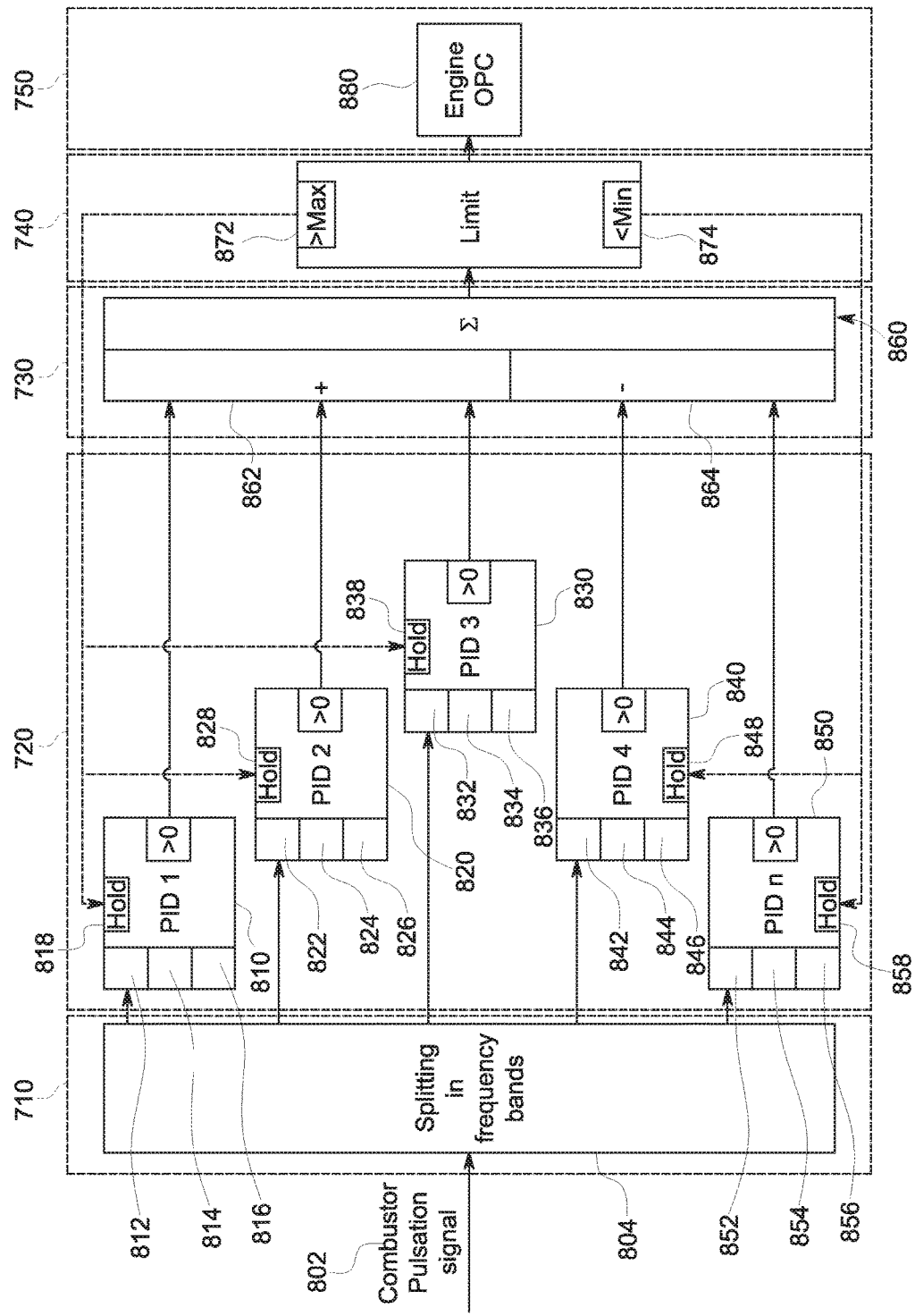
FIG. 8 is a block diagram of the control structure implemented by the gas turbine controller of FIG. 7 implemented in the example gas turbine of FIG. 1.

FIG. 8 is a block diagram of the control structure implemented by the gas turbine controller 700 of FIG. 7 implemented in the example gas turbine 100 of FIG. 1. In the illustrated example, a combustion pulsation signal 802 is received at the example combustion pulsation signal processor 710 and processed by a frequency band splitter 804. In the illustrated example, the frequency band splitter 804 splits the example combustion pulsation signal 802 into at least five distinct pressure pulsation frequency bands. In other examples, the example frequency band splitter may divide the example combustor pulsation signal into more or fewer pressure pulsation frequency bands.

In the illustrated example, a first particular pressure pulsation frequency band is sent to a first subcontroller 810 within the example correction calculator 720 of FIG. 7. The example first subcontroller has a frequency band receiver 812, an amplitude threshold 814, a set of control parameters 816, and an inhibiter 818. Similarly, subcontrollers 820, 830, 840, and 850 have frequency band receivers 822, 832, 842, and 852 respectively; amplitude thresholds 824, 834, 844, and 854 respectively; sets of control parameters 826, 836, 846, and 856 respectively; and inhibiters 828, 838, 848, and 858 respectively. The example subcontrollers 810, 820, 830, 840, and 850 are proportional-integral-derivative (PID) controllers, but may be proportional (P) controllers, proportional-integral (PI) controllers, or some other type of controller.

In accordance with the present disclosure, the first subcontroller 810 receives a particular frequency band via the example frequency band receiver 812. The example first subcontroller 810 evaluates the particular frequency band via the example set of control parameters 816 and the amplitude threshold 814. In one example, the amplitude of the example particular frequency band received by the frequency band receiver 812 is above the example amplitude threshold 814. In the example, the subcontroller 810 generates the example correction value based on the set of control parameters 816 (e.g., proportional gain, integral gain, derivative gain, weighting factor, etc.).

Alternatively, if the example amplitude of the particular frequency band received by the frequency band receiver 812 is below the example amplitude threshold 814, no correction value is generated. The correction values generated by subcontrollers 810, 820, 830, 840, and 850 can be positive and/or negative values.

While the above disclosure is described in connection with the example subcontroller 810, it should be understood the description applies to each subcontroller 810, 820, 830, 840, and 850 in the example correction calculator 720. For example, each subcontroller 810-850 can have similar components and operating parameters and operate as described above with respect to the example first subcontroller 810.

In the illustrated example, correction values from subcontrollers 810, 820, 830, 840, 850 are sent from the example correction calculator 720 to the net correction calculator 730 when at least one pressure pulsation band amplitude is above the respective amplitude threshold 814, 824, 834, 844, or 854. For example, an aggregate correction value generator 860 receives correction values correlating to a richer S1R in a positive field 862 and correction values correlating to a leaner S1R in a negative field 864. The example aggregate correction value generator 860 adds a total magnitude of all correction values received in the positive field 862 and subtracts a total magnitude of all the correction values received in the negative field to generate an aggregate correction value. In some examples, the aggregate correction value is positive correlating to a richer S1R change. However, in other examples, the aggregate correction value is negative, correlating to a leaner S1R change. In other examples, the magnitude of the correction values received in the positive field 862 is negated by the magnitude of the correction values received in the negative field 864, and the aggregate correction value is neither positive nor negative.

The aggregate correction value generated by the example aggregate correction value generator is sent from the example net correction calculator 730 to the example subcontroller limiter 740. The example subcontroller limiter 740 has a maximum limit 872 and a minimum limit 874. For example, an aggregate correction value received by the subcontroller limiter 740 greater than the example maximum limit 872 sends a signal to inhibiters 818, 828, and 838. The example inhibiters 818, 828, and 838 are connected to subcontrollers 810, 820, and 830, respectively, and inhibit the respective subcontrollers 810, 820, and 830 from increasing the correction value generated and sent to the example positive field 862. Similarly, a signal is sent from the example subcontroller limiter 740 to inhibiters 848 and 858 when the aggregate correction value was beneath the example minimum limit 874.

In the illustrated example of FIG. 8, the example subcontroller limiter 740 passes the aggregate correction value to an engine object linking and embedding for process control (OPC) component 880 of the example parameter controller 750. The example engine OPC component 880 controls the example stage one fuel flow 126, increasing the stage one fuel flow 126 when the aggregate correction value is positive and decreasing the stage one fuel flow 126 when the aggregate correction value is negative. In other examples, the example engine OPC component 880 can control various parts of the engine combustion such as the example TAT1 or the example variable inlet guide vanes 130 to control the pressure pulsation.

Figure 9A:
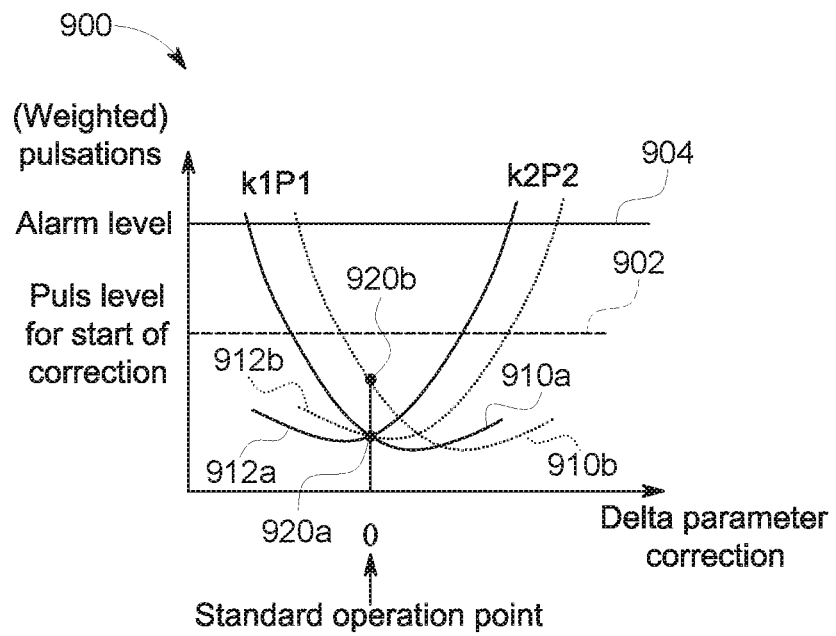
FIG. 9A is a plot of pulsation amplitudes of example pulsation frequency bands in relation to an example shifting gas turbine operation window.

FIG. 9A is a plot of pulsation amplitudes 900 of example pulsation levels in relation to an example shifting operation window. The example plot of pulsation amplitudes 900 compares amplitude pulsations based on a parameter correction. In the illustrated example, the plot of pulsation amplitudes 900 includes a pulsation threshold 902 and an alarm level 904. In some examples, the example pulsation threshold 902 and the example alarm level 904 can be located differently on the graph, (e.g., farther apart, etc.) and/or the alarm level 904 can be lower than the pulsation threshold 902.

Additionally, in the illustrated example, the plot of pulsation amplitudes 900 includes a normal operating window moved to a shifted operating window. Normal low frequency line 910a moves to shifted low frequency line 910b; similarly, a normal high frequency line 912a moves to a shifted high frequency line 912b. In accordance with the present disclosure, an operating point 920a of the gas turbine is indicated at an intersection between normal low frequency line 910a and normal high frequency line 912a. The example operating point 920a indicates an operating parameter providing lowest amplitude pulsations between two conflicting frequency bands.

In the illustrated example of FIG. 9A, the example gas turbine 100 is operating according to normal operating parameters (e.g., there is no correction, the correction value is zero). During normal operating parameters and no shifted operation window, the amplitude of pulsations can be measured at the example normal operating point 920a. The operation window represents a range of operation parameters with which the example gas turbine 100 can operate at without corrective action on any frequency band. However, as the operation window shifts (e.g., referred to as a shifting operation window or a shifted operation window, etc.), the highest amplitude of pulsations can be measured at an operating point 920b. The example operating point 920b is beneath the pulsation threshold 902. In such an example, the example gas turbine 100 can incur higher amplitude pulsations, but no correction is applied to the operating parameter.

Figure 9B:
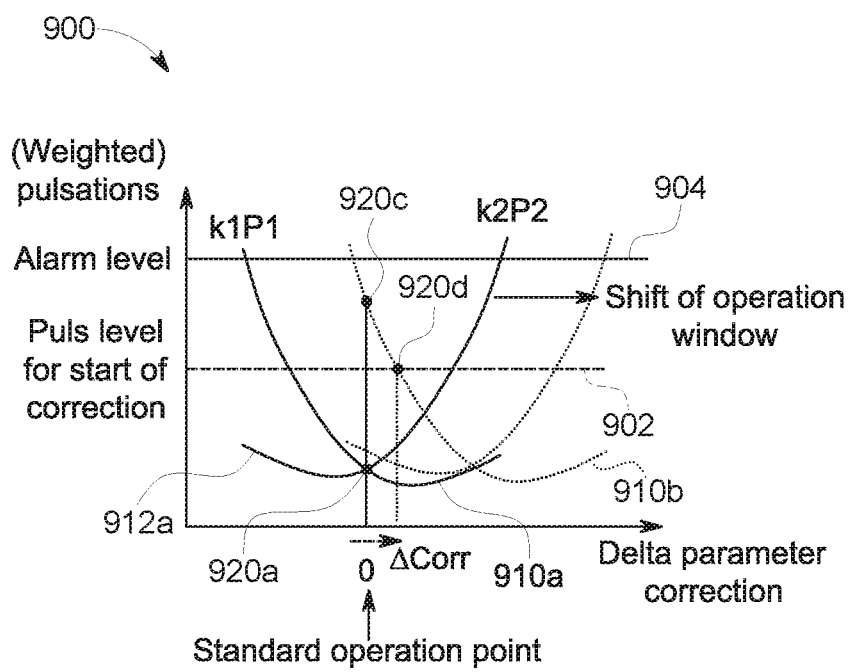
FIG. 9B is a plot of pulsation amplitudes of example pulsation frequency bands in relation to an example shifting operation window and correction values implemented by the gas turbine controller of FIG. 7.

FIG. 9B is a plot of pulsation amplitudes 900 of example pulsation levels in relation to an example shifting operation window and correction values implemented by the example gas turbine controller 700 of FIG. 7. In this example plot of pulsation amplitudes 900, the operation window has further moved when compared to the shifted operation window of FIG. 9A, and the amplitude of pulsations incurred by the example gas turbine 100 while operating at normal operating parameters is measured at an operating point 920c. The example operating point 920c is above the pulsation threshold 902.

In the illustrated example of FIG. 9B, a correction value is applied by the example gas turbine controller 700 of FIG. 7. The example correction value corrects the operating parameters such that a highest amplitude incurred by the example gas turbine 100 is measured by an operating point 920d. The example operating point 920d corresponds to an intersection of the pulsation threshold 902 and the shifted low frequency line 910b.

Figure 9C:
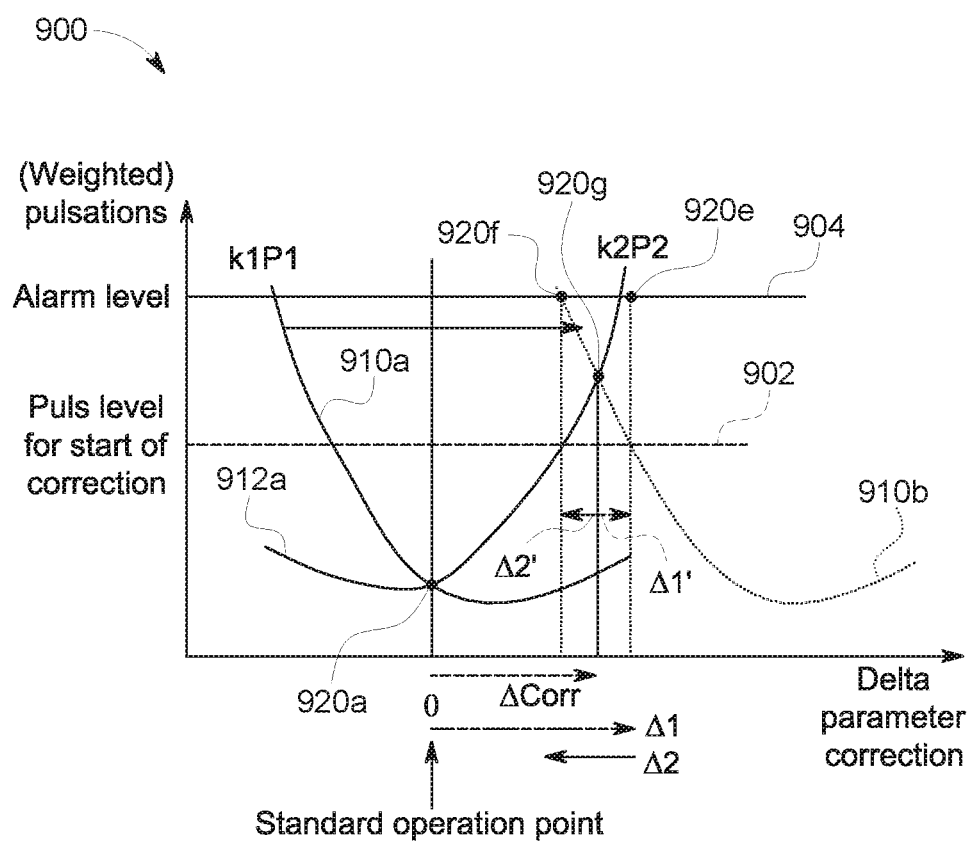
FIG. 9C is a plot of pulsation amplitudes of example pulsation frequency bands in relation to an example shifting operation window and correction values implemented by the gas turbine controller of FIG. 7.

FIG. 9C is a plot of pulsation amplitudes 900 of example pulsation levels in relation to an example shifting operation window and correction values implemented by the example gas turbine controller 700 of FIG. 7. In this example of the example plot of pulsation amplitudes 900, only normal low frequency line 910a is shifted to shifted low frequency line 910b. In the illustrated example, correction values to control pressure pulsation amplitudes according to a shifted low frequency line 910b or normal high frequency line 912a result in operation above an operating point 920e or 920f respectively. For example, both the example points 920e and 920f are above the example alarm limit 904 and can activate possibly damaging corrective measures. In such examples, the gas turbine controller 700 determines a correction value for the lowest possible pressure pulsation amplitude at an intersection between shifted low frequency line 910b and normal high frequency line 912a.

While an example manner of implementing the gas turbine controller 700 of FIG. 7 is illustrated in FIG. 8, one or more of the elements, processes and/or devices illustrated in FIG. 7 may be combined, divided, re-arranged, omitted, eliminated and/or implemented in any other way. Further, the example combustion pulsation signal processor 710, the example correction calculator 720, the example net correction calculator 730, the example subcontroller limiter 740, and the example parameter controller 750 and/or, more generally, the example gas turbine controller 700 of FIG. 7 may be implemented by hardware, software, firmware and/or any combination of hardware, software and/or firmware. Thus, for example, any of the example combustion pulsation signal processor 710, the example correction calculator 720, the example net correction calculator 730, the example subcontroller limiter 740, and the example parameter controller 750 and/or, more generally, the example gas turbine controller 700 could be implemented by one or more analog or digital circuit(s), logic circuits, programmable processor(s), application specific integrated circuit(s)

(ASIC(s)), programmable logic device(s) (PLD(s)) and/or field programmable logic device(s) (FPLD(s)). When reading any of the apparatus or system claims of this patent to cover a purely software and/or firmware implementation, at least one of the example, combustion pulsation signal processor 710, the example correction calculator 720, the example net correction calculator 730, the example subcontroller limiter 740, and the example parameter controller 750 is/are hereby expressly defined to include a tangible computer readable storage device or storage disk such as a memory, a digital versatile disk (DVD), a compact disk (CD), a Blu-ray disk, etc. storing the software and/or firmware. Further still, the example gas turbine controller 700 of FIG. 7 may include one or more elements, processes and/or devices in addition to, or instead of, those illustrated in FIG. 8, and/or may include more than one of any or all of the illustrated elements, processes and devices.

Figure 10:
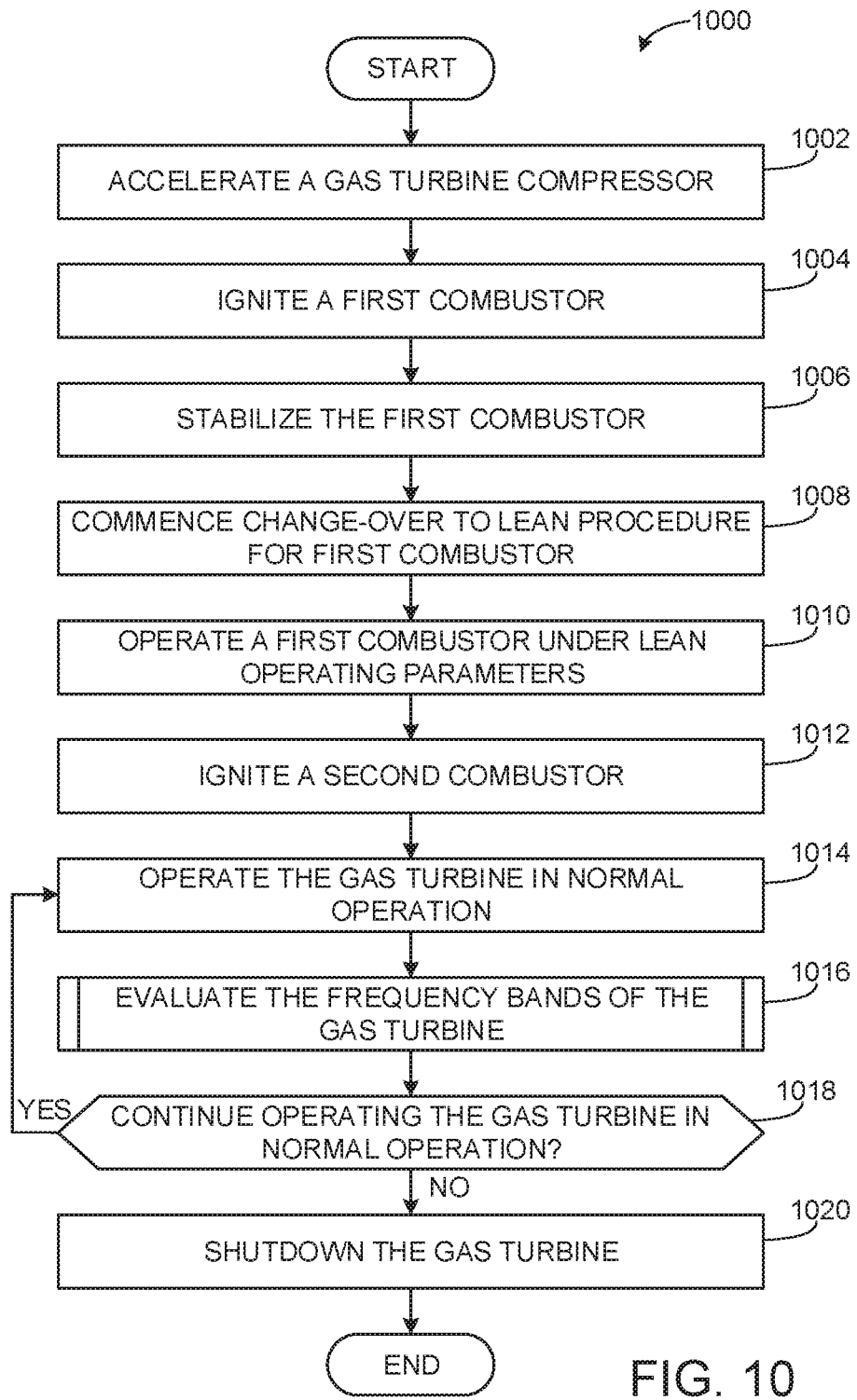
FIG. 10 is a flowchart representative of an example method that may be executed for normal startup and operation of the example gas turbine of FIG. 1.
Figure 11:
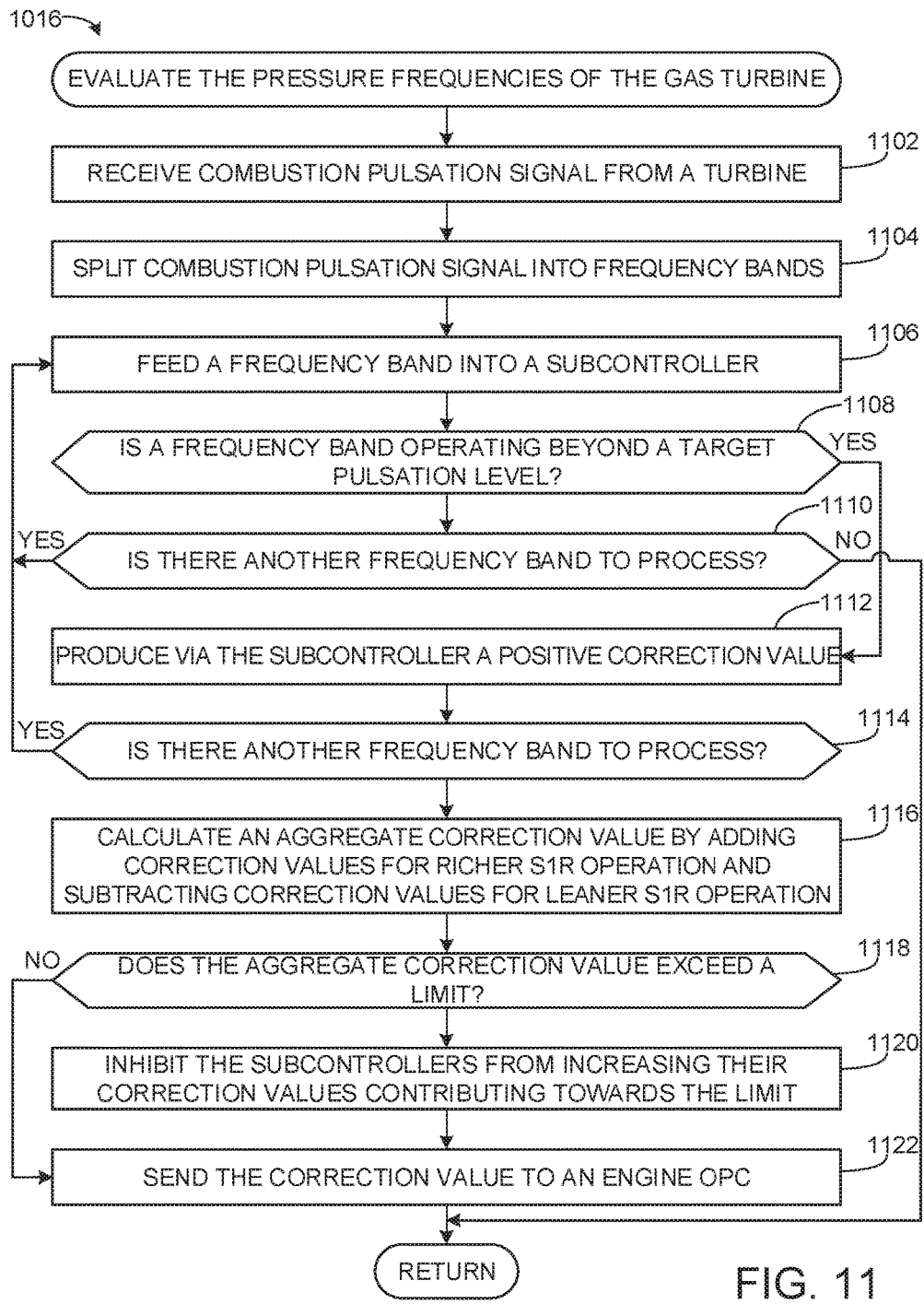
FIG. 11 is a flowchart representative of an example method that may be executed by the example gas turbine controller of FIG. 7 to control the pulsations of the example gas turbine of FIG. 1.

A flowchart representative of example machine readable instructions for implementing the gas turbine controller 700 of FIG. 7 is shown in FIG. 10 and FIG. 11. In this example, the machine readable instructions comprise a program for execution by a processor such as the processor 1212 shown in the example processor platform 1200 discussed below in connection with FIG. 7. The program may be embodied in software stored on a tangible computer readable storage medium such as a CD-ROM, a floppy disk, a hard drive, a digital versatile disk (DVD), a Blu-ray disk, or a memory associated with the processor 1212, but the entire program and/or parts thereof could alternatively be executed by a device other than the processor 1212 and/or embodied in firmware or dedicated hardware. Further, although the example program is described with reference to the flowchart illustrated in FIG. 10 and FIG. 11, many other methods of implementing the example gas turbine controller 700 may alternatively be used. For example, the order of execution of the blocks may be changed, and/or some of the blocks described may be changed, eliminated, or combined.

As mentioned above, the example processes of FIG. 10 and FIG. 11 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIG. 10 and FIG. 11 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 10 is a flowchart representative of an example method 1000 to be executed for normal startup and operation of the example gas turbine 100 of FIG. 1. The example method 1000 can be performed at least in part by machine readable instructions executed by the example gas turbine controller 700 of FIG. 7. Additionally, the example method 1000 is described in connection with the gas turbine 100 of FIG. 1, but can, in some examples, be applicable to other gas turbine designs and arrangements.

In the illustrated example, the method 1000 begins at block 1002. At the example block 1002, the gas turbine 100 is accelerated by an external source, and air is compressed via the example staged compressor 104. The example method 1000 continues to block 1004 after the first combustion chamber is adequately pressurized. For example, the first combustion chamber may be adequately pressurized when the rotor is rotating at greater than 1000 revolutions per minute.

At block 1004, the example first combustor 106 is ignited. Ignition of the first combustor 106 includes igniting the example stage one fuel flow 126 and the example stage two fuel flow 128. For example, at this time the stage one fuel flow 126 is operating at approximately 90% of the first fuel flow 122. The method 1000 continues to block 1006 after ignition has been confirmed.

At block 1006, the example first combustor 106 is operated at a high S1R while the combustion in the first combustion chamber stabilizes. The example gas turbine 100 idles until the combustion has stabilized. Additionally, in some examples, a minimum load may be added to the example gas turbine 100 at this point. The method 1000 then continues to block 1008.

At block 1008, the first combustor 106 undergoes the example change-over to lean operation, during which the S1R is reduced from approximately 90% to approximately 25%. Pulsation peaks are likely to occur during the change-over to lean operation, as the stability of the flame and ignition temperature are constantly changing. For example, the method 1000 proceeds to block 1010.

At block 1010, the example gas turbine 100 continues to warm up as the S1R is now operating at lean operating parameters. In some examples, autoignition of the example second combustor 110 cannot occur until the TAT1 is high enough to ignite the fuel. When the second combustor 110 is hot enough to autoignite the example second fuel flow 124, the method 1000 continues to block 1012.

At block 1012, the example second fuel flow 124 is ignited in the example second combustors 110 via autoignition. In some examples, the second combustors 110 can be activated all at once, while in other examples a subset of the second combustors 110 are ignited. After the second combustor 110 has been ignited, the method 1000 continues to block 1014

At block 1014, the example gas turbine 100 operates at the normal operating set point. The normal operating set point of the example gas turbine 100 can, in some examples, include operating at desired pressure amplitudes, flame temperatures, power generation, etc. (e.g., 20 bar, 1650 kelvin, or 500 megawatts, etc.). During normal operation, the method 1000 continues to block 1016.

At block 1016, the example gas turbine controller 700 is activated and evaluates the frequency bands of the example gas turbine 100. In some examples, the example gas turbine controller 700 is activated and operates during startup operation and change-over to lean operation. When the gas turbine controller 700 determines the frequency bands are operating beyond a threshold, the example gas turbine controller 700 activates a control action and the method proceeds to block 1018. Otherwise, if the frequency bands are operating within a threshold, no control action is activated and the method 1000 proceeds to block 1018.

At block 1018, the example gas turbine controller 700 determines if the gas turbine 100 is to continue operating at normal operation. When the example gas turbine 100 is to continue operating in normal operation, the method 1000 proceeds to block 1014. Otherwise, the method 1000 proceeds to block 1020 and the example gas turbine 100 is shut down.

FIG. 11 is a flowchart representative of an example implementation of block 1016 of the method 1000 described above with respect to FIG. 10. The implementation of the block 1016 can be executed by the example gas turbine controller 700 of FIG. 7 to control the pulsations of the example gas turbine 100 of FIG. 1. The example method 1016 can be performed at least in part by machine readable instructions executed by the example gas turbine controller 700. In the illustrated example, the method 1016 is described in connection with the example gas turbine 100 of FIG. 1.

At block 1102, the example combustion pulsation signal processor 710 receives the combustion pulsation signal 802 from the example gas turbine 100 of FIG. 1. In certain examples, the combustion pulsation signal 802 includes pressure amplitude pulsation values for frequencies ranging from 5 Hz to 200 Hz. The method 1016 then continues to block 1104. At block 1104, the example combustion pulsation signal processor 710 splits the example combustion pulsation signal 802 into several frequency bands. In certain examples, the frequency bands have an average frequency band range of approximately 50 Hz, in other examples the frequency bands may be larger or smaller on average. The example combustion pulsation signal processor 710 sends the frequency bands to the example correction calculator 720. The method 1016 then continues to block 1106.

At block 1106, a frequency band is fed through the example correction calculator 720 to the first subcontroller 810. In the illustrated example of FIG. 8, the example correction calculator 720 includes five subcontrollers 810, 820, 830, 840, and 850 for five frequency bands. In other examples, there may be more or fewer frequency bands and corresponding subcontrollers. Each frequency band has a designated subcontroller to which the frequency band is designated. In accordance with the present disclosure, at block 1106, the first subcontroller 810 receives, via the example frequency band receiver 812, the frequency band signal. After the example first subcontroller 810 receives the frequency band signal, the example method 1016 continues to block 1108.

At block 1108, the first subcontroller 810 determines if the pressure amplitude of the frequency band is above the example amplitude threshold 814 (e.g., the amplitude is 70 mbar above the normal operating set point). If the pressure amplitude of the frequency band is not beyond the amplitude threshold 814, the example method 1016 proceeds to block 1110 to check if another frequency band is available to be processed. If the pressure amplitude of the frequency band is beyond the example amplitude threshold 814, the example method 1016 proceeds to block 1112.

At block 1112, the example first subcontroller 810 produces a correction value in response to the pressure amplitude exceeding the example amplitude threshold 814. The example correction calculator sends the example correction value determined by the example first subcontroller 810 to the net correction calculator 730. Next, the method 1016 proceeds to block 1114.

At blocks 1110 and 1114, the correction calculator 720 determines if there are additional frequency bands to process. If, at either block 1110 or block 1114, the example correction calculator 720 determines that not all frequency bands have been processed, the method 1016 proceeds to block 1106 where the next subcontroller 820, 830, 840, or 850 is fed the respective frequency band. In the illustrated example, at block 1110, if the example correction calculator 720 determines all frequency bands have been processed, the example method 1016 returns to block 1018 of FIG. 10. Also in the illustrated example, at block 1114, if the example correction calculator 720 determines all frequency bands have been processed, the example method proceeds to block 1116.

At block 1116, the example net correction calculator 730 receives correction values from the correction calculator 720. In accordance with the present disclosure, correction values correlated to richer S1R operation are added to the aggregate correction value while correction values correlated to leaner S1R operation are subtracted from the aggregate correction value. In other examples, the correction values correlated to leaner S1R operation are generated from the example correction calculator 720 as negative values and added to the aggregate correction value. Additionally or alternatively, correction values correlated to hotter hot gas temperature (e.g., flame combustion temperature, TAT1, exhaust temperature etc.) are added to the aggregate correction value while correction values correlated to cooler hot gas temperature are subtracted from the aggregate correction value. After the example net correction calculator 730 has generated the aggregate correction value, the method 1016 proceeds to block 1118.

At block 1118, the example subcontroller limiter 740 receives the aggregate correction value. The subcontroller limiter 740 determines if the aggregate correction value exceeds either the example maximum limit 872 or the example minimum limit 874. If the example subcontroller limiter 740 determines the aggregate correction value exceeds either the maximum limit 872 or the minimum limit 874, the example method 1016 proceeds to block 1120. Otherwise, if the aggregate correction value does not exceed either limit, the example method 1016 proceeds to block 1122.

At block 1120, the example subcontroller limiter 740 sends a signal to one or more inhibiters 818, 828, 838, 848, and/or 858. In the illustrated example of FIG. 8, if the aggregate correction value exceeds the example maximum limit 872, the example subcontroller limiter 740 sends a signal to inhibiters 818, 828, and 838 to limit the example subcontrollers 810, 820, and 830 respectively. The example subcontrollers 810, 820, and 830 of the present example are contributing to the example aggregate correction value exceeding the example maximum limit 872, and their individual correction values will not be permitted to increase in magnitude. Similarly, in the illustrated example of FIG. 8, the subcontroller limiter 740 can inhibit example subcontrollers 840 and 850 if the aggregate correction value exceeds the example minimum limit 874. After the example subcontroller limiter 740 has limited all subcontrollers 810, 820, 830, 840, and/or 850 contributing to the example aggregate correction value exceeding either the maximum limit 872 or the minimum limit 874, the method proceeds to block 1122.

At block 1122, the example parameter controller 750 receives the example aggregate correction value. In accordance with the present disclosure, the example parameter controller 750 activates a control action. For example, the control action is an increase of the S1R if the aggregate correction value is positive, or a decrease of the S1R if the aggregate correction value is negative. In other examples, the example parameter controller can control other engine control variable such as the TAT1, the angle of the variable inlet guide vanes, or the firing temperature. After the example parameter controller 750 enacts a correction, the example method 1016 returns to block 1018 of FIG. 10.

Thus, certain examples enable more precise control response to simultaneous pressure pulsation peaks by addressing both high and low frequency pulsations associated with gas turbine operation. For example, by addressing both high and low frequency pulsations, certain examples enable more precise, detailed tuning of gas turbine operation by addressing both positive (richer) and negative (leaner) control actions (e.g., corrections, adjustments etc.).

Figure 12:
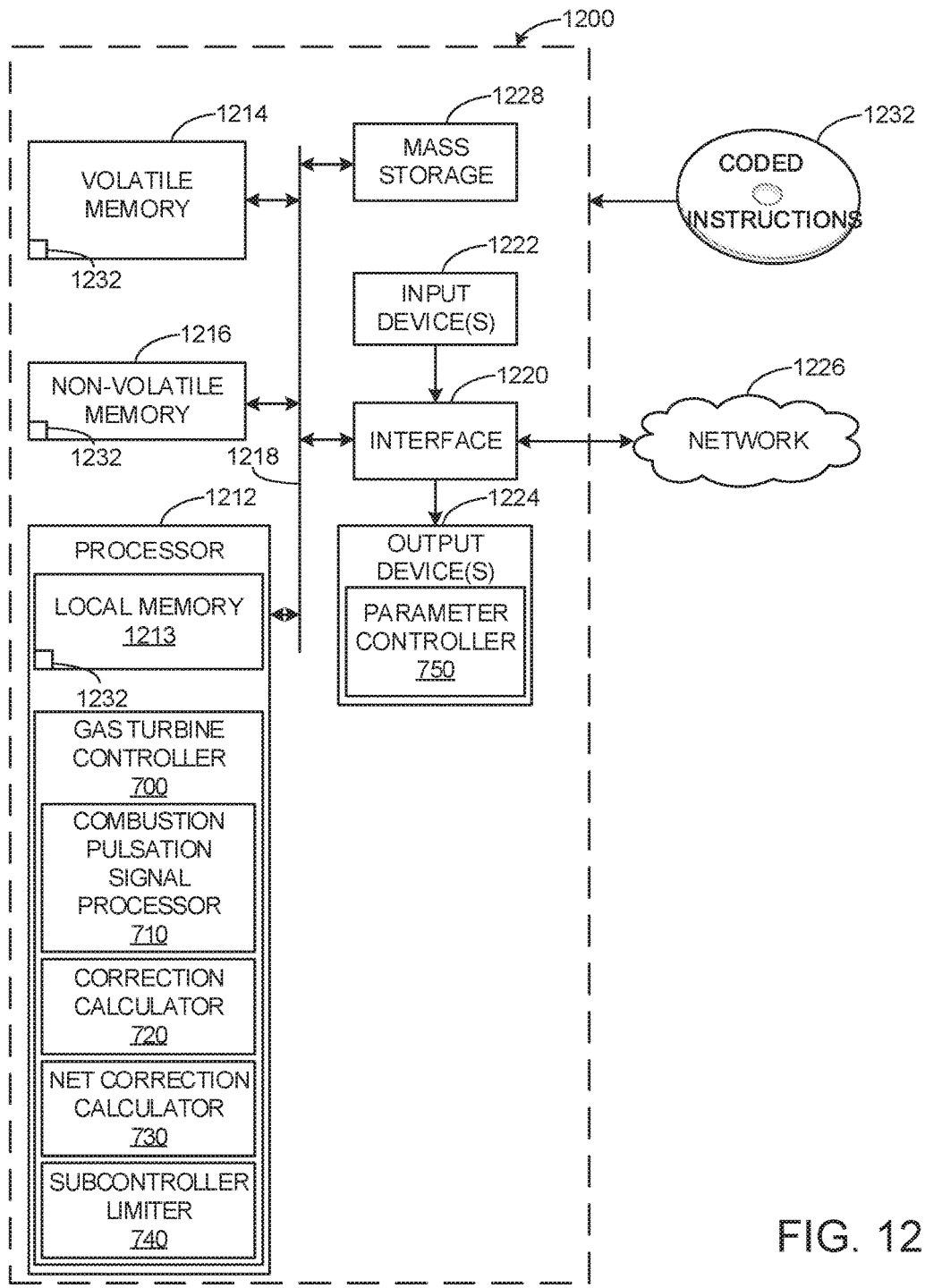
FIG. 12 is an example processor platform diagram that may implement the methods of FIG. 10 and FIG. 11 and the example gas turbine controller of FIG. 7.

FIG. 12 is a block diagram of an example processor platform 1200 capable of executing the instructions of FIG. 10 and FIG. 11 to implement the gas turbine controller 700 of FIG. 7. The processor platform 1200 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 1200 of the illustrated example includes a processor 1212. The processor 1212 of the illustrated example is hardware. For example, the processor 1212 can be implemented by one or more integrated circuits, logic circuits, microprocessors or controllers from any desired family or manufacturer.

The processor 1212 of the illustrated example includes a local memory 1213 (e.g., a cache). The processor 1212 of the illustrated example is in communication with a main memory including a volatile memory 1214 and a non-volatile memory 1216 via a bus 1218. The volatile memory 1214 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1216 may be implemented by flash memory and/or any other desired type of memory device. Access to the main memory 1214, 1216 is controlled by a memory controller. Additionally, the processor 1212 can also include the example combustion pulsation signal processor 710, the example correction calculator 720, the example net correction calculator 730, and the example subcontroller limiter 740.

The processor platform 1200 of the illustrated example also includes an interface circuit 1220. The interface circuit 1220 may be implemented by any type of interface standard, such as an Ethernet interface, a universal serial bus (USB), and/or a PCI express interface.

In the illustrated example, one or more input devices 1222 are connected to the interface circuit 1220. The input device(s) 1222 permit(s) a user to enter data and commands into the processor 1212. The input device(s) can be implemented by, for example, a keyboard, touchscreen, mouse, a voice recognition system, an audio sensor, a microphone, pressure sensors, temperature sensors, and/or a camera (still or video).

One or more output devices 1224 are also connected to the interface circuit 1220 of the illustrated example. The output devices 1024 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1220 of the illustrated example, thus, typically includes a graphics driver card, a graphics driver chip or a graphics driver processor. Additionally, the output devices 1224 can also include the example parameter controller 750.

The interface circuit 1220 of the illustrated example also includes a communication device such as a transmitter, a receiver, a transceiver, a modem and/or network interface card to facilitate exchange of data with external machines (e.g., computing devices of any kind) via a network 1226 (e.g., an Ethernet connection, a digital subscriber line (DSL), a telephone line, coaxial cable, a cellular telephone system, etc.).

The processor platform 1200 of the illustrated example also includes one or more mass storage devices 1228 for storing software and/or data. Examples of such mass storage devices 1228 include floppy disk drives, hard drive disks, compact disk drives, Blu-ray disk drives, RAID systems, and digital versatile disk (DVD) drives.

The coded instructions 1232 of FIG. 10 and FIG. 11 may be stored in the mass storage device 1228, in the volatile memory 1214, in the non-volatile memory 1216, and/or on a removable tangible computer readable storage medium such as a CD or DVD.

From the foregoing, it will be appreciated that the above disclosed methods, apparatus and articles of manufacture protect against several, simultaneous pulsation peaks impacting stability and performance in a gas turbine. Examples disclosed herein control several pulsation signals operating outside their normal operating range to better maintain a gas turbine engine at the normal operating set point. By aggregating the corrections of all pulsation signals outside their normal operating range, the engine is protected from simultaneous pressure pulsation peaks, which damage the various gas turbine engine components and shorten the life of the gas turbine combustors. Additionally, examples disclosed herein can be employed to inhibit controllers from correcting beyond a controller limit, which prevents overcorrection disadvantageous to proper operation of the gas turbine (e.g., engine trip, lean blow-off, etc.). Thus, examples disclosed herein help ensure increased reliability of gas turbine engines and reduced maintenance costs over the life of the gas turbine engine.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus for closed loop control of a gas turbine having an operating set point, the apparatus comprising:
a frequency band splitter to separate a combustion pulsation signal into a plurality of frequency bands, the combustion pulsation signal representing pulsation measurement data of the gas turbine, each frequency band having a combustion pulsation characteristic and a normal operating set point associated with an amplitude of a respective portion of the combustion pulsation signal to control operation of the gas turbine;

a plurality of subcontrollers to control the gas turbine, each subcontroller corresponding to one of the plurality of frequency bands and the associated combustion characteristic and normal operating set point of the respective frequency band, wherein each subcontroller is to be activated at an amplitude threshold associated with the normal operating set point of the frequency band and is to generate a correction value while the amplitude of the combustion pulsation signal in the corresponding frequency band is operating beyond the amplitude threshold;

a net correction output calculator to sum the correction values from the plurality of subcontrollers together to generate an aggregated correction value; and a subcontroller limiter having at least one of a maximum limit or a minimum limit to inhibit at least one of the subcontrollers from increasing its respective correction value when the aggregated correction value reaches at least one of the maximum limit or the minimum limit.

2. The apparatus of claim 1, wherein the subcontroller limiter is to stop inhibiting the one or more subcontrollers when the aggregated correction value no longer is to satisfy the maximum limit or the minimum limit.

3. The apparatus of claim 1, wherein each of the subcontrollers is a proportional-integral-derivative (PID) controller having a set of control parameters based on the combustion characteristic and normal operating set point of the corresponding frequency band.

4. The apparatus of claim 3, wherein the set of control parameters for each PID controller includes a weighting factor assigned to each of the subcontrollers, the weighting factor to impact a rate at which an associated subcontroller is adjusted based on an effect of the corresponding frequency band on operation of the gas turbine.

5. The apparatus of claim 1, further including a parameter controller to initiate a control action corresponding to the aggregated correction value to control a frequency band operating beyond the amplitude threshold.

6. The apparatus of claim 5, wherein the control action is an adjustment to a hot gas temperature.

7. The apparatus of claim 6, wherein the hot gas temperature is a turbine outlet temperature and wherein the aggregated correction value is at least one of a positive aggregated correction value or a negative aggregated correction value, and wherein the positive aggregated correction value is an increase in the turbine outlet temperature and the negative aggregated correction value is a decrease in the turbine outlet temperature.

8. A method for controlling a gas turbine having a plurality of combustion frequencies, the method comprising:

splitting a combustion pulsation signal into a plurality of frequency bands, the combustion pulsation signal representing pulsation measurement data of the gas turbine, each frequency band having a combustion pulsation characteristic and a normal operating set point associated with an amplitude of a respective portion of the combustion pulsation signal to control operation of the gas turbine;

evaluating each of the plurality of frequency bands using a corresponding subcontroller in a plurality of subcontrollers to:
determine whether the frequency band meets a pressure amplitude threshold; and
determine a correction value activated by the corresponding subcontroller while the amplitude of the combustion pulsation signal in the corresponding frequency band is operating beyond the pressure amplitude threshold;

summing the correction values from each of the plurality of subcontrollers together to generate an aggregated correction value; and inhibiting at least one of the plurality of subcontrollers from increasing its respective correction value when the aggregated correction value reaches at least one of a maximum limit or a minimum limit.

9. The method of claim 8, further including removing the inhibiting when the aggregated correction value does not satisfy the maximum limit or the minimum limit.

10. The method of claim 8, further including initiating a control action to control the frequency bands meeting the pressure amplitude threshold.

11. The method of claim 10, wherein the control action is an adjustment to a fuel flow ratio.

12. The method of claim 11, wherein the fuel flow ratio is a stage one fuel flow ratio, and wherein the aggregated correction value is at least one of a positive aggregated correction value or a negative aggregated correction value, and wherein the positive aggregated correction value is an increase in the stage one fuel flow ratio and the negative aggregated correction value is a decrease in the stage one fuel flow ratio.

13. The method of claim 10, wherein the frequency band meets the pressure amplitude threshold when the amplitude corresponding to the frequency band is greater than a threshold.

14. A computer readable storage medium comprising instructions that, when executed, cause a controller to at least:

split a combustion pulsation signal into a plurality of frequency bands, the combustion pulsation signal representing pulsation measurement data of a gas turbine, each frequency band having a combustion pulsation characteristic and a normal operating set point associated with an amplitude of a respective portion of the combustion pulsation signal to control operation of the gas turbine;

evaluate each of the plurality of frequency bands using a corresponding subcontroller in a plurality of subcontrollers to:
determine whether the frequency band meets a pressure amplitude threshold associated with the normal operating set point; and
determine a correction value activated by the corresponding subcontroller while the amplitude of the combustion pulsation signal in the corresponding frequency band is operating beyond the pressure amplitude threshold;

sum the correction values from each of the plurality of subcontrollers together to generate an aggregated correction value; and inhibit at least one of the plurality of subcontrollers from increasing its respective correction value when the aggregated correction value reaches at least one of a maximum limit or a minimum limit.

15. The computer readable storage medium of claim 14, wherein the instructions, when executed, further cause the controller to remove the inhibiting when the aggregated correction value does not satisfy the maximum limit or the minimum limit.

16. The computer readable storage medium of claim 14, wherein the instructions, when executed, further cause the controller to initiate a control action to control the frequency bands meeting the pressure amplitude threshold.

17. The computer readable storage medium of claim 16, wherein the control action is an adjustment to a fuel flow ratio.

18. The computer readable storage medium of claim 17, wherein the fuel flow ratio is a stage one fuel flow ratio, and wherein the aggregated correction value is at least one of a positive aggregated correction value or a negative aggregated correction value, and wherein the positive aggregated correction value is an increase in the stage one fuel flow ratio and the negative aggregated correction value is a decrease in the stage one fuel flow ratio.

19. The computer readable storage medium of claim 16, wherein the control action is an adjustment to a hot gas temperature.

20. The computer readable storage medium of claim 19, wherein the hot gas temperature is a turbine outlet temperature, and wherein the aggregated correction value is at least one of a positive aggregated correction value or a negative aggregated correction value, and wherein the positive aggregated correction value is an increase in the turbine outlet temperature and the negative aggregated correction value is a decrease in the turbine outlet temperature.

\* \* \* \* \*